(12) United States Patent
Kataria et al.

(10) Patent No.: US 11,221,765 B2
(45) Date of Patent: Jan. 11, 2022

(54) APPARATUS AND METHOD FOR EXECUTING BACKGROUND OPERATIONS USING ROTATIONAL POSITION SORTING

(71) Applicant: Seagate Technology LLC, Cupertino, CA (US)

(72) Inventors: Abhay T. Kataria, Longmont, CO (US); LingZhi Yang, Longmont, CO (US); Jonathan H. Ormsby, Longmont, CO (US)

(73) Assignee: Seagate Technology, LLC, Fremont, CA (US)

( * ) Notice: Subject to any disclaimer, the term of this patent is extended or adjusted under 35 U.S.C. 154(b) by 0 days.

(21) Appl. No.: 16/855,041

(22) Filed: Apr. 22, 2020

(65) Prior Publication Data

US 2021/0334008 A1 Oct. 28, 2021

(51) Int. Cl.
*G06F 3/06* (2006.01)
*G06N 3/08* (2006.01)

(52) U.S. Cl.
CPC .......... *G06F 3/0611* (2013.01); *G06F 3/0659* (2013.01); *G06F 3/0676* (2013.01); *G06N 3/08* (2013.01)

(58) Field of Classification Search
CPC ...... G06F 3/0611; G06F 3/061; G06F 3/0659; G06F 3/0676; G06F 3/0613; G06F 3/0655; G06F 3/0656; G06N 3/08
See application file for complete search history.

(56) References Cited

U.S. PATENT DOCUMENTS

| 5,444,583 | A | 8/1995 | Ehrlich et al. | |
| 5,787,482 | A * | 7/1998 | Chen | G06F 3/0601 711/158 |
| 6,826,630 | B2 | 11/2004 | Olds et al. | |
| 6,892,250 | B2 | 5/2005 | Hoskins | |
| 8,751,861 | B2 | 6/2014 | Nair et al. | |
| 9,594,781 | B2 | 3/2017 | Ghodsnia et al. | |
| 10,522,185 | B1 * | 12/2019 | Hall | G06F 3/0676 |
| 2005/0025022 | A1 * | 2/2005 | Nakagawa | G11B 20/18 369/59.23 |
| 2013/0067274 | A1 * | 3/2013 | Huang | G06F 3/0683 714/6.22 |
| 2018/0314448 | A1 * | 11/2018 | Grossman | G06F 15/76 |

OTHER PUBLICATIONS

V. Zhou, "Machine Learning for Beginners: An Introduction to Neural Networks," 2019, available: https://victorzhou.com/blog/intro-to-neural-networks/.*

(Continued)

*Primary Examiner* — Tracy A Warren
(74) *Attorney, Agent, or Firm* — Mueting Raasch Group

(57) ABSTRACT

A background operation is internally triggered by firmware of a disk drive. During a training phase defined by a first time period, access latency of host commands is monitored during rotational position sorting command selection. During a sorting phase after the training phase, a sorting threshold is defined based on the access latencies measured during the training phase. The background command is selected for execution in the sorting phase if the seek and rotational latency is less than the sorting threshold.

17 Claims, 5 Drawing Sheets

(56) References Cited

OTHER PUBLICATIONS

M. Kumar, "An Efficient Disk Scheduling Algorithm Using Binary Search Tree," 1st International Conference on Advances in Information Technology, 2019.*

Celis, J.R., Gonzales, D., Lagda, E. and L. Rutaquio, Jr., "A Comprehensive Review for Disk Scheduling Alorithms," IJCSI International Journal of Computer Science Issues, vol. 11, Issue 1, No. 1, 2014.*

Hooda, P. and S. Raheja, "A New Approach to Disk Scheduling Using Fuzzy Logic," Journal of Computer and Communications, 2014, 2, 1-5.*

Bachmat, E. and J. Schindler, "Analysis of Methods for Scheduling Low Priority Disk Drive Tasks," Proceedings of the 2002 ACM SIGMETRICS International Conference on Measurement and Modeling of Computer Systems, 2002, pp. 55-65.*

Jacobson, D.M. and J. Wilkes, "Diskscheduling algorithms based on rotational position," HP Laboratories Technical Report, HPL-CSP-91-7rev1, 1991.*

Lumb, C.R., Schindler, J. and G.R. Gnager, "Freeblock Scheduling Outside of Disk Firmware," Conference on File and Storage Technologies (FAST), Jan. 28-30, 2002.*

\* cited by examiner

APPARATUS AND METHOD FOR EXECUTING BACKGROUND OPERATIONS USING ROTATIONAL POSITION SORTING

SUMMARY

The present disclosure is directed to an apparatus and method for executing background commands using rotational position sorting. In one embodiment, a background operation is determined for a disk drive. The background operation is internally triggered by firmware of the disk drive. During a training phase defined by a first time period, a sorting threshold of the command is determined based on at least seek and rotational latencies of host commands during rotational position sorting command selection. The background operation is added to a command queue. In a sorting phase defined by a second time period, the background command is selected for execution by the disk drive if a current seek and rotational latency is less than the sorting threshold.

In another embodiment, a background operation is internally triggered by firmware of a disk drive. During a training phase defined by a first time period, access latency of host commands is monitored during rotational position sorting command selection. During a sorting phase after the training phase, a sorting threshold is defined based on the access latencies measured during the training phase, the background command being selected for execution in the sorting phase if the seek and rotational latency is less than the sorting threshold.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to hard disk drives. A hard disk drive (HDD) is typically coupled to a host (e.g., disk drive controller on a motherboard, disk array controller in a storage server) via a storage interface, e.g., SATA, SAS, USB, Ethernet. The host commands the HDD to perform storage operations such as read, write, and verify. The speed with which the HDD responds can respond to host requests depend on a number of factors, such as rotation speed of the disk, seek speed of the actuators that move the read/write heads over the disk, and parallelism features (e.g., two or more independent actuators).

Modern HDDs may perform regular background tasks to ensure the drive components can perform consistently in the face of changing environmental conditions and aging of drive components. For example, conventional HDDs (e.g., perpendicular recording) may regularly perform calibrations of the read/write transducers, servo systems, fly height, etc. Due to the need for constantly increasing areal density, the number and complexity of these background tasks may increase. For example, high areal densities may require more precise tracking and smaller fly heights, possibly resulting in more complex and time-consuming calibrations. Also, with newer recording technologies such as heat-assisted magnetic recording (HAMR), additional calibration tasks may be needed for the lasers and optical delivery systems that are also integrated with the read/write heads.

While the background tasks ensure the reliability and consistent performance of the HDD, they can impact the drive performance from the standpoint of the host. During times when large numbers of input/output (IO) requests are sent to the drive, the completion times of the IO requests may decrease if the HDD has to take time out to perform internal housekeeping operations.

Figure 1:
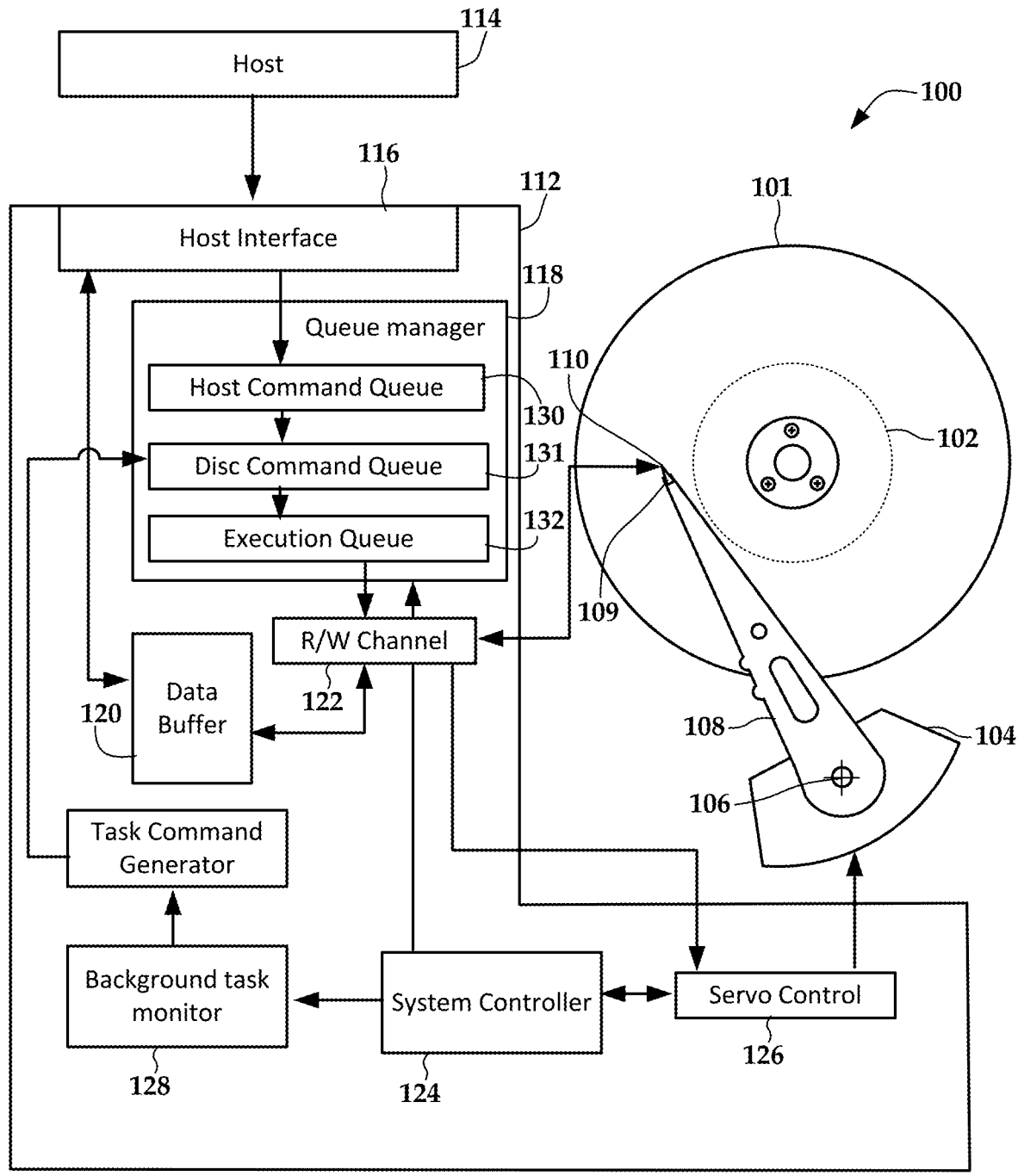
FIG. 1 is a block diagram of an apparatus according to an example embodiment.

The present disclosure is directed to an HDD controller that can efficiently manage background tasks to minimize impacts to host IO. To better understand the concepts described below, the block diagram in FIG. 1 shows details of an HDD which may utilize background task management as described herein. An HDD 100 includes a spindle motor 102 that rotates one or more disks 101. Information is written to and read from tracks on the disks 101 via an actuator assembly 104, which rotates during a seek operation about an axis 106 positioned adjacent the disks 101. The actuator assembly 104 includes one or more actuator arms 108 that extend towards the disks 101, with one or more head-gimbal assemblies 109 extending from each of the actuator arms 108. Mounted at the distal end of each head-gimbal assembly 109 is a head 110 that includes read and write transducers, e.g., magnetoresistive sensors, write coils, etc.

During a seek operation, the track position of the heads 118 is controlled through the actuator assembly 104, which typically uses a voice coil motor (VCM) to rotate the arms 108. The controlled application of current to the VCM causes the heads 110 to move across the surfaces of the disks 101. The heads 110 are positioned over one or more tracks containing data and servo information for controlling the position of the heads 110.

The HDD 100 includes one or more circuit boards 112 for controlling its operations. For example, the circuit boards 112 include a host interface 116 that receives commands and/or data from a host 114 (e.g., a computer and/or drive controller board). The host commands are buffered and processed via a queue manager 118 to optimize command completion time (CCT). Data that is to be written to or read from the HDD 100 may be stored in a volatile or non-volatile data buffer 120. A read/write channel 122 encodes and serializes the data and provides the requisite write current signals to the heads 110. To retrieve data that has been previously stored by the HDD 100, read signals are generated by the heads 110 and provided to the read/write channel 122, which performs decoding and error detection and correction operations and outputs the retrieved data to the host interface 116 for subsequent transfer to the host 114.

A system controller 124 may include one or more processors (e.g., microprocessor, co-processors, digital signal processors, etc.) that run software/firmware that provides top-level communication and control for the HDD 100. The system controller 124 also provides control signals for spindle motor 102 and actuator 104 via servo controller 126. The system controller 124 also operates a background task manager 128 that manages the prioritization and execution of background commands dictated by software/firmware of the system controller 124.

In operation, the host 114 sends commands to the HDD 100 with instructions to read data from or write data to the disks 101. A "write" command typically includes data to be written to the disks 101 along with a logical address indicating where the data is to be written. A "read" command typically includes a logical address indicating the location or locations of data to be read, and a size indicator indicating the number of bytes to be read. The commands are received by the host interface 116, where they may be processed immediately or stored for later processing via the queue manager. The queue manager 118 may store the commands and their associated data and/or addresses so that the commands can be sorted, ordered, or prioritized in such a way that IOPS performance may be improved.

The illustrated queue manager 118 is shown utilizing three queues 130-132, although in practice more or fewer queues may be used. A host command queue 130 is used to store commands after receipt via the host interface 116. The commands are implemented as data structures referred to as 'command nodes' that include command data (e.g., track, sector, data size, addresses within the data buffer 120 where data to be written is cached) as well as pointers to other nodes, e.g., pointers to next and previous nodes in doubly-linked list implementations.

Some of command nodes from the host queue 130 are placed into the disk command queue 131. Some command nodes from the host queue 130 may not be placed in the disk command queue 131 if the commands don't need to be immediately serviced via the disk hardware, such as write commands that are cached in a fast memory (e.g., volatile memory, flash memory, etc.) The nodes of the disk command queue 131 are sorted based on an optimization algorithm that considers disk latency as well as other factors (e.g., aging of the command). For example, a rotational position sort (RPS) algorithm will place command nodes into the sorted queue 131 according to, among other things, a time it takes for the affected heads to reach positions on the disks 101 (e.g., track, sector) which are accessed by the command. The RPS algorithm may take into account a number of latencies, including, but not limited to, the rotational latency, the seek time, and the disk access time. When a command is ready to be executed, it is moved into the execution queue 132, where it is executed immediately if no commands are currently being executed, or after the completion of a currently executing command.

As noted above, the background task monitor 128 manages the performance of background tasks, which may include any task involving the drive hardware that is not initiated by the host 114. Examples of background tasks include calibrations of the heads 110 and servo systems, system self-test, movement of data between a non-volatile cache and the disk 101, internal calibrations, etc. The background tasks will compete with host commands, and this contention may appear to the host 114 as a reduction in performance if the background tasks delay the completion of a significant number of host commands.

Background tasks may be timer based or event based, such as thermal-related calibrations. The tasks may involve operations performed on dedicated calibration tracks, which prevent them from being embedded into normal host IO, since host IO happens on data tracks. These calibrations can be host IO interruptible. To reduce the IOPS and CCT impact, it is common to break a long calibration into multiple events and spread them evenly in time. The design intention is to distribute the background task as small atomic operations over time so that the impact is acceptable to the end-user. The CCT cost of background tasks includes seek overhead, rotational latency overhead and the data collection overhead. Reducing seek and rotational latency overhead could help to mitigate the impact.

Timer-based trigger methods have drawbacks in that they are not bound by RPS sorting. Due to this, the seek and rotational latency overhead in executing background tasks can be high, and this may provide unacceptable performance for some use cases. For example, a timer-based background task can cause 99.99% CCT to increase by 30 ms during 4 KB Q1 random read workload. If the HD performance requirement is significantly less than 60 ms, then this may be an unacceptable impact.

Figure 2:
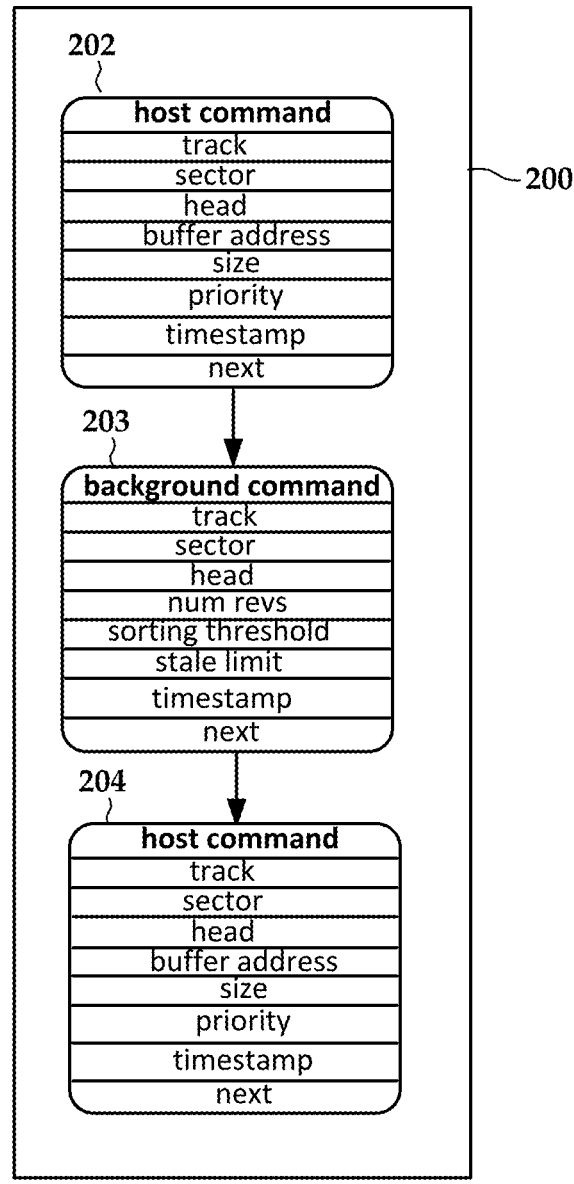
FIG. 2 is a block diagram of a command queue according to an example embodiment.

One solution is to add the background tasks into the command queue, so that the RPS engine can optimize the seek and rotational overhead through sorting. In FIG. 2, a block diagram shows a command queue 200 used by HDD firmware according to an example embodiment. The queue 200 may be sorted or unsorted, and is shown with three nodes 202-204. The nodes 202-204 are arranged as a singly-linked list in this example, although other data structures may be used, e.g., doubly linked list, binary tree, etc.

The queue 200 is shown with two host command nodes 202, 204 and a background command node 203. The nodes 202-203 include data fields that represent the command to be executed (e.g., track, sector, head, buffer address), fields that are used by the sorting algorithm (e.g., priority, timestamp), and fields used to arrange the queue (e.g., next pointer). Note that this is a simplified representation of the command nodes, and in practice the command nodes may have more detailed information and/or different information.

The nodes 202-204 may have some data in common, such as track, sector, etc. This is because both host and background commands will operate on tracks, sectors, and heads of the HDD. However, the background command node 203 may not require references to stored data from a memory buffer, as any data used in such commands may be procedurally generated (e.g., pure tones, random data). The background command node 203 may also include an operation code (not shown) that indicates what procedure the background command will perform. If the background command operates on entire tracks, then a starting sector may not need to be defined in the background command node 203, as the command may start at an arbitrary sector on the track.

The handling of the background command node 203 in the command queue (e.g., disk command queue 131 as shown in FIG. 1) can help reduce the latency of the execution of the background and/or have less impact on the latency of the host commands. However, the typical CCT-sensitive workload is queue depth of 1, adding the background task to the sorting queue will only bring it to queue depth of 2, which means the amount that seek and rotational latency overhead can be reduced through sorting may be limited in that scenario. For example, on 16 TB CMR, 4 KB Q1 full stroke random read IOPS is 83 ms, Q2 is 98 ms, which means adding the background task to command queue can only lower the average CCT cost by 2 ms.

Background tasks in the command queue have other differences from host IO, in that the background task commands are not host visible, so they do not have stringent CCT requirement and they are not reported in the host queue depth. This implies a way to improve performance in low queue depth scenarios. Traditional sorting algorithms only rely on the commands sitting in the queue at the moment to decide the best servicing sequence, in which case the command servicing sequence in the past may be of no use. The proposed new device and method utilizes a neural network algorithm, thus the history of the command servicing signature can be used to train the network to predict the best possible cost to invoke the background command for the current workload. For example, in some embodiments the neural network (which may be configured as a feedforward neural network, a recurrent neural network, a convolutional neural network etc.) takes the seek and rotational latencies of the host commands as inputs during training to minimize a cost function. Generally, the cost function includes an expected impact to the monitored host commands based on inserting a background command into the host command queue. Once the network is trained, its output is used to define the background command sorting threshold within a pre-selected servicing window. This window is defined to ensure the sorting can meet halt condition regardless of the quality of the neural network.

One factor to consider in the opportunistic sort is the choice of sorting threshold, which is the allowable latency which can be incurred to start the disk operations defined by the command. If the overhead threshold is chosen too high, it will reduce the benefit as the latency involved in servicing the background commands can delay the execution of host commands. If the overhead threshold is chosen too low, it will lead to command aging and reversion to timer-based performance. A potential candidate for the threshold is to set it to pass customer-defined CCT specifications for host commands. For example, consider a specification where 4 KB Q1 random read CCT needs to be within 45 ms. If the typical CCT without background tasks plus background data collection overhead is 40 ms, this means the selection threshold for the background task needs to be less than 5 ms. Because background tasks could be launched in any workloads, this makes it hard to pre-define the threshold that works all the time.

Since background commands may not have a stringent CCT spec, and are typically triggered over a relatively long period, the code could split the background command sorting into two phases, a training phase and sorting phase. Training phase has a predefined time slot, for example within 1.5 second (or between 0.5 and 2.0 seconds) since the background command is added into queue, the seek and sorting cost for the background command, and the minimum value of latency found during the training phase could be used to set a modified threshold during the sorting phase, the modified threshold ultimately being used as sorting threshold in a subsequent sorting phase. The threshold training allows the threshold to be changed adaptively to handle the CCT variation of different workloads.

To prevent the background command from sitting in the queue forever, a stale limit can be assigned. When the background command is aged out as indicated by the stale limit, it should be selected as soon as possible, thus reverting to timer-based methods. Since the background tasks typically has multiple calls, if the sequence is not coupled together, they are not ordered and could be added to the queue simultaneously, thus, the background queue depth can be higher than 1. The rate that the background tasks are added into the queue controls the ratio between background task to host IO. The rate that the background tasks are added also controls how long the background tasks will be completed.

Figure 3:
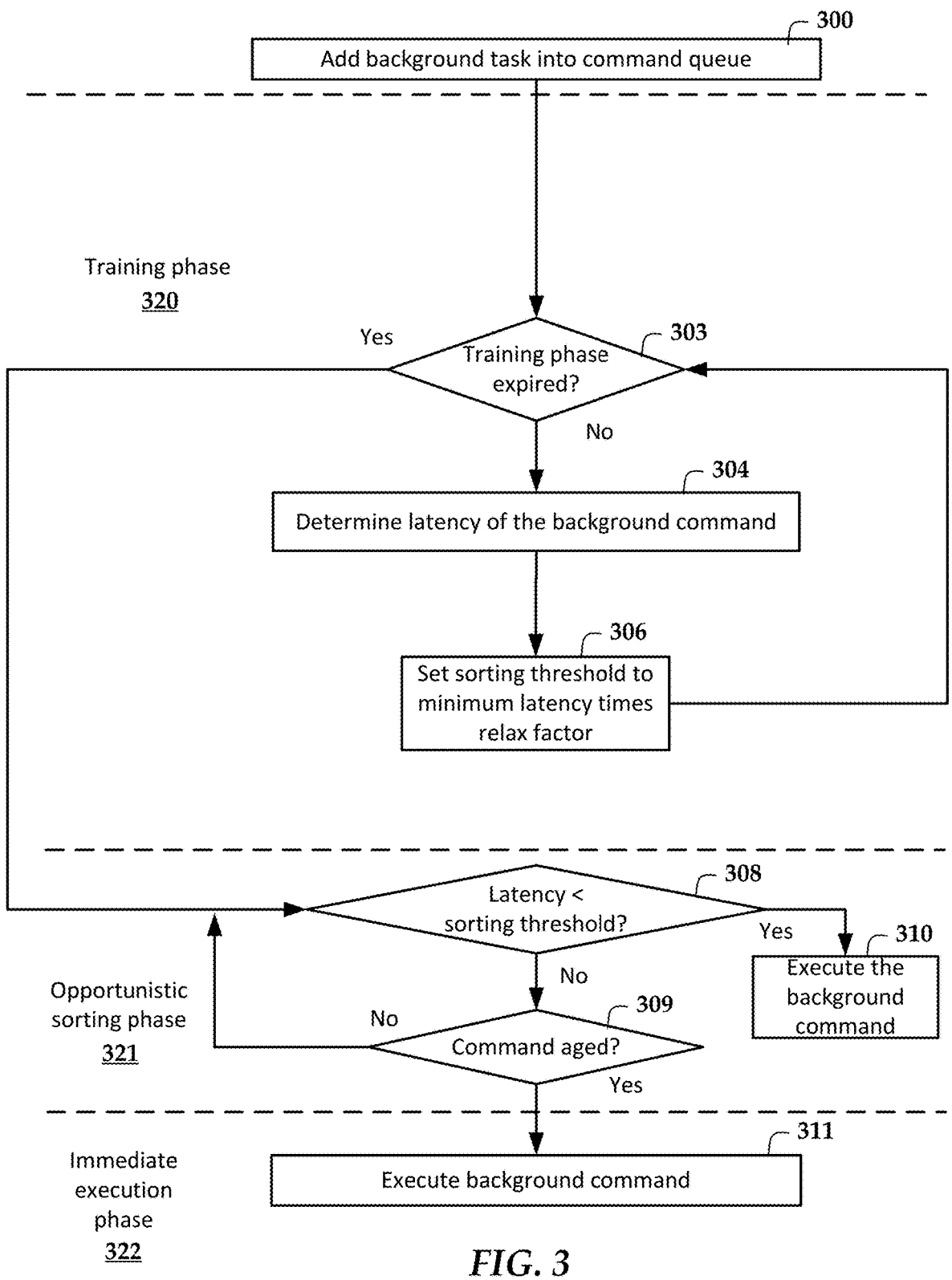
FIG. 3 is a flowchart illustrating the opportunistic sorting of background tasks according to an example embodiment.

In FIG. 3, a flowchart illustrates an opportunistic sort of background commands according to an example embodiment. A background task is added 300 into command queue (preferably the disk queue, not the host queue). The data used to form the background task node may include calibration track, head, start sector, data collection revolutions, and stale limit. During the training phase 320 (for example 1.5 second), the minimum latency of the background command (e.g., minimum or seek and rotational latency) during RPS selection is calculated 304. Based on the minimum latency, the sorting threshold is set 306, e.g., minimum overhead*relax_factor, the relax factor increasing the threshold, e.g., relax factor=1.2, 1.3, etc.

When block 303 exits at 'yes' and the opportunistic sorting phase 321 is entered. This phase involves testing whether the latency of the background command is less than the sorting threshold, and executing the command 310 if so. Otherwise, the command is tested 309 to see if it has aged. If the background command ages, it is selected for execution 311 as soon as possible, which is referred to here as the immediate execution phase 322.

Figure 4:
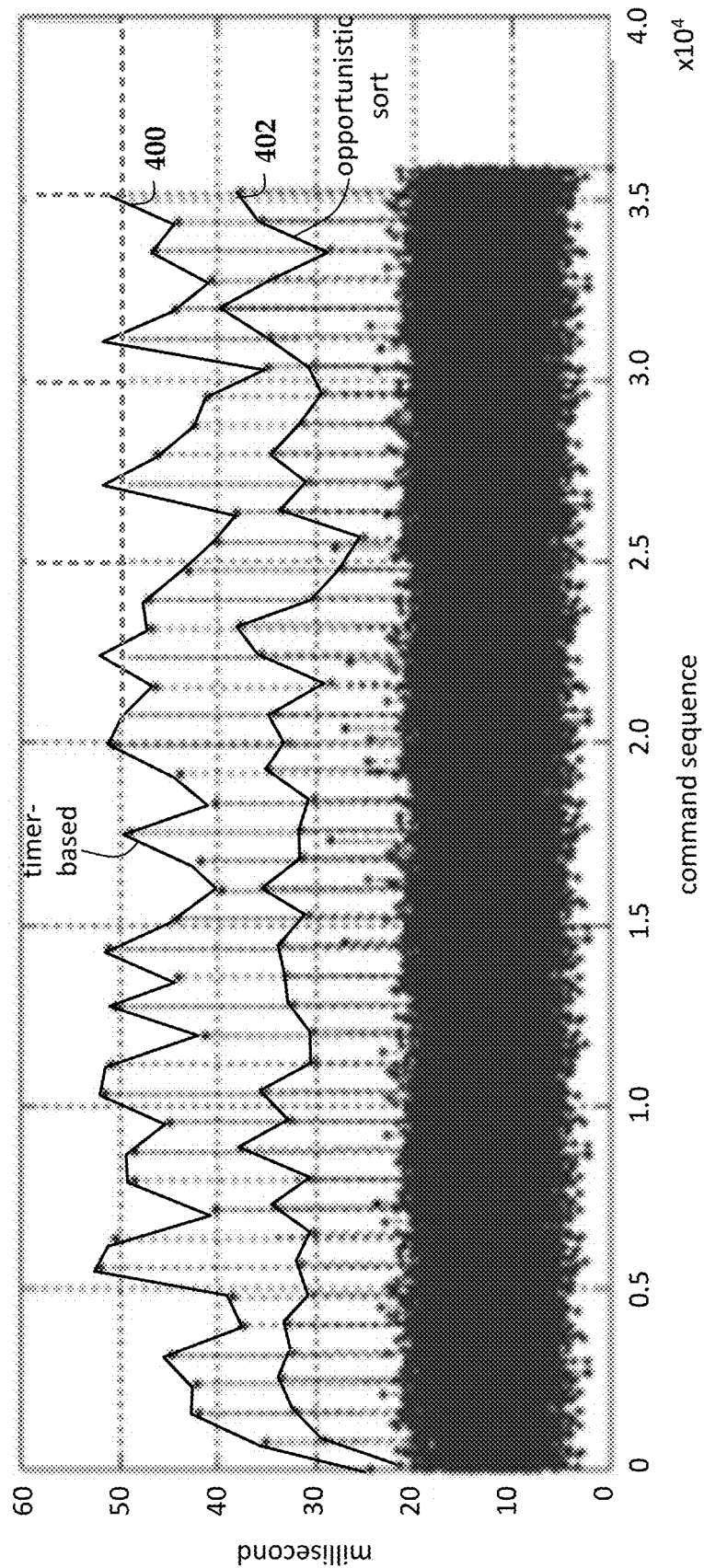
FIG. 4 is a graph showing simulation results of opportunistic sorting of background tasks according to an example embodiment.

In FIG. 4, a graph shows a simulation of opportunistic sorted background commands according to an example embodiment. The graph compares the CCT simulation using timer-based method (curve 400) and opportunistic sorted method (curve 402) to launch atomic operations. The curves 400, 402 generally indicate the elapsed times of the operations for the two different methods. The data collection time for the calibration is two revs for both methods. The x-axis is command sequence, y axis is command completion time in milliseconds.

For the opportunistic sort method 402, the overhead threshold was set to 4 ms according to neural network training. When the background task is added into the command queue for the opportunistic sort method 402, the command will not be picked by the sorting engine, unless the seek and rotational latency overhead is less than 4 ms. Curve 400 shows the CCT when background task is timer based, with the timer set to 10 seconds without regards to latencies involved in starting the task.

The simulation shows when setting the sorting threshold to 4 ms, background tasks will have to wait for 58 commands on average, and 160 commands maximum before they get selected. This translates to a wait time of 700 milliseconds on average and 2 seconds maximum to lower the mean CCT from 45 ms to 33 ms, a 12 ms reduction vs the 2 ms reduction that can be achieved with simple Q2 RPS sorting method.

Figure 5:
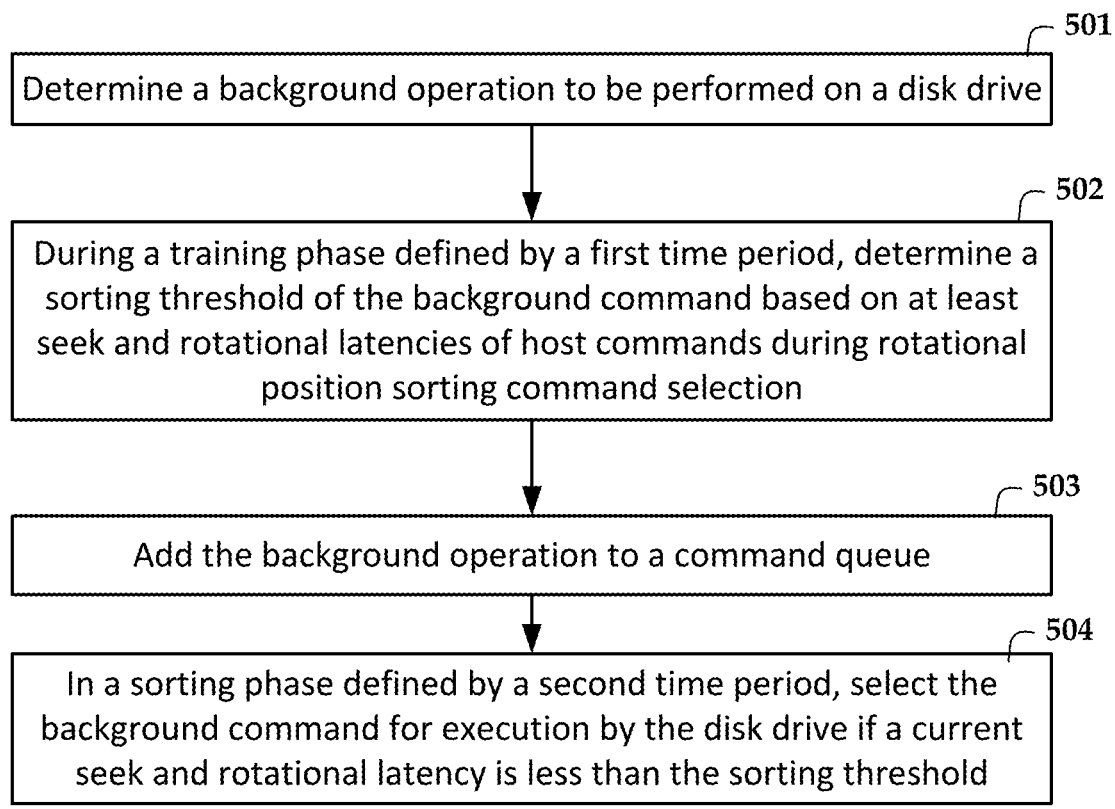
FIGS. 5 and 6 are flowcharts of methods according to example embodiments.

In FIG. 5, a flowchart shows a method according to an example embodiment. The method involves determining 501 a background operation to be performed on a disk drive. The background operation is internally triggered by firmware of the disk drive. During a training phase defined by a first time period, a sorting threshold of the command is determined 503 based on at least seek and rotational latencies of host commands during rotational position sorting command selection. The background operation is added 502 to a command queue where the background operation is associated with the sorting threshold. In a sorting phase defined by a second time period, the background command is selected 504 for execution by the disk drive if a current seek and rotational latency is less than the sorting threshold.

Figure 6:
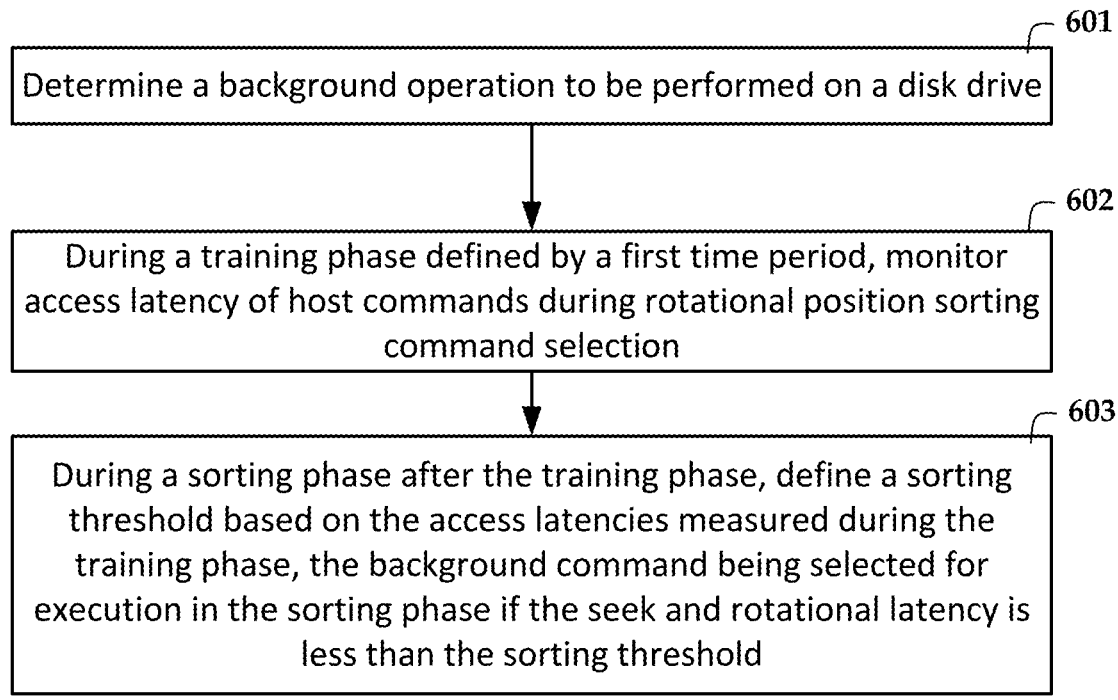

In FIG. 6, a flowchart shows a method according to another example embodiment. The method involves determining 601 a background operation to be performed on a disk drive, the background operation internally triggered by firmware of the disk drive. During a training phase defined by a first time period, access latency of host commands is monitored 602 during rotational position sorting command selection. During a sorting phase after the training phase, a sorting threshold is defined 603 based on the access latencies measured during the training phase, the background command being selected for execution in the sorting phase if the seek and rotational latency is less than the sorting threshold.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining a background command to be performed on a disk drive, the background command internally triggered by firmware of the disk drive;
   during a training phase defined by a first time period, determining a sorting threshold of the background command based on at least seek and rotational latencies of host commands during rotational position sorting command selection, the sorting threshold comprising an allowable latency of the host commands, a value of the sorting threshold being selected to minimize an expected impact to execution of the host commands caused by inserting the background commands into a command queue that sorts both the background command and the host commands, the sorting threshold being the maximum of: a preliminary sorting threshold; and a minimum value of the rotational latency measured in the training phase multiplied by a factor that is greater than one;
   adding the background command to the command queue using the sorting threshold; and
   in a sorting phase defined by a second time period, selecting the background command for execution by the disk drive if a current seek and rotational latency is less than the sorting threshold.

2. The method of claim 1, wherein the training phase utilizes a neural network that takes the seek and rotational latencies of the host commands as inputs and determines the sorting threshold.

3. The method of claim 1, wherein if the background command is not selected during the second time period, the background command is selected for execution as soon as possible.

4. The method of claim 1, wherein the command queue is a disk queue, wherein host commands targeting disk operations are also placed in the disk queue with the background command, the host commands also being selected via the rotational position sorting command selection.

5. The method of claim 1, wherein the first time period is between 0.5 seconds and 2.0 seconds.

6. The method of claim 1, wherein the background command is part of a background task performed over one or more full tracks of the disk drive and starts at an arbitrary sector of the one or more full tracks, wherein the background task is broken into a plurality of atomic operations that are spread evenly over time, the atomic operations including the background command.

7. A method comprising:
   determining a background command to be performed on a disk drive, the background command internally triggered by firmware of the disk drive, the background command being part of a background task performed over one or more full tracks of the disk drive and starting at an arbitrary sector of the one or more full tracks, wherein the background task is broken into a plurality of atomic operations that are spread evenly over time, the atomic operations including the background command;
   during a training phase defined by a first time period, monitoring access latency of host commands during rotational position soiling command selection;
   defining a sorting threshold based on the access latencies measured during the training phase, the sorting threshold comprising an allowable latency of the host commands, a value of the sorting threshold being selected to minimize an expected impact to execution of the host commands caused by inserting the background commands into a command queue that sorts both the background command and the host commands; and
   during a sorting phase after the training phase selecting the background command for execution if the seek and rotational latency is less than the sorting threshold.

8. The method of claim 7, wherein the training phase utilizes a neural network that takes the seek and rotational latencies of the host commands as inputs and minimizes a cost function, the minimized cost function providing the sorting threshold that minimizes expected impacts to the host commands during the training phase.

9. The method of claim 7, wherein the sorting phase occurs over a sorting time period, and if the background command is not selected during the sorting time period, the background command is selected for execution as soon as possible.

10. The method of claim 7, wherein the sorting threshold is the maximum of:
    a preliminary sorting threshold; and
    a minimum value of a rotational latency measured in the training phase multiplied by a factor that is greater than one.

11. The method of claim 7, wherein if the background command is not selected during the sorting phase, the background command is selected for execution as soon as possible after the sorting phase.

12. The method of claim 7, wherein host commands targeting disk operations are also placed in a disk queue with the background command, the host commands also being selected via the rotational position sorting command selection.

13. The method of claim 7, wherein the training phase is between 0.5 seconds and 2.0 seconds.

14. A disk drive, comprising:
    a host interface configured to receive host commands that are processed by a command queue of the disk drive;
    a controller coupled to the host interface and configured to:

determine a background command to be performed on the disk drive, the background command internally triggered by firmware of the disk drive;

during a training phase defined by a first time period, determine a sorting threshold of the background command based on at least seek and rotational latencies of the host commands during command selection, the sorting threshold comprising an allowable latency of the host commands, a value of the sorting threshold being selected to minimize an expected impact to execution of the host commands caused by inserting the background commands into a command queue that sorts both the background command and the host commands, the sorting threshold being the maximum of: a preliminary sorting threshold; and a minimum value of the rotational latency measured in the training phase multiplied by a factor that is greater than one;

add the background command to the command queue using the sorting threshold; and in a sorting phase defined by a second time period, select the background command for execution by the disk drive if a current seek and rotational latency is less than the sorting threshold.

15. The disk drive of claim 14, wherein the training phase utilizes a neural network that takes the seek and rotational latencies of the host commands as inputs and minimizes a cost function, the minimized cost function providing the sorting threshold that minimizes expected impacts to the host commands during the training phase.

16. The disk drive of claim 14, wherein if the background command is not selected during the second time period, the background is selected for execution as soon as possible.

17. The disk drive of claim 14, wherein the background command is part of a background task performed over one or more full tracks of the disk drive and starts at an arbitrary sector of the one or more full tracks, wherein the background task is broken into a plurality of atomic operations that are spread evenly over time, the atomic operations including the background command.

* * * * *